US012115610B2

(12) United States Patent
Huber et al.

(10) Patent No.: US 12,115,610 B2
(45) Date of Patent: Oct. 15, 2024

(54) DUST HOOD FOR A POWER TOOL

(71) Applicant: Hilti Aktiengesellschaft, Schaan (LI)

(72) Inventors: Franz Huber, Oberneufach (DE);
Xaver Hanslmeier, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 331 days.

(21) Appl. No.: 17/441,143

(22) PCT Filed: Mar. 24, 2020

(86) PCT No.: PCT/EP2020/058082
§ 371 (c)(1),
(2) Date: Sep. 20, 2021

(87) PCT Pub. No.: WO2020/207781
PCT Pub. Date: Oct. 15, 2020

(65) Prior Publication Data
US 2022/0152767 A1  May 19, 2022

(30) Foreign Application Priority Data

Apr. 8, 2019 (EP) ..................... 19167793

(51) Int. Cl.
*B23Q 11/00* (2006.01)
*B24B 55/05* (2006.01)
*B28D 7/02* (2006.01)

(52) U.S. Cl.
CPC ...... *B23Q 11/0046* (2013.01); *B23Q 11/0071* (2013.01); *B24B 55/052* (2013.01); *B28D 7/02* (2013.01)

(58) Field of Classification Search
CPC ............ B23Q 11/0046; B23Q 11/0071; B24B 55/052; B28D 7/02; B25F 5/02

USPC ........ 173/197, 81, 90, 200, 140–141, 162.1, 173/213, 168–171
See application file for complete search history.

(56) References Cited

U.S. PATENT DOCUMENTS

| 2,144,586 | A | * | 1/1939 | Kelley | .................... | E21B 21/07 |
| | | | | | | 175/218 |
| 2,990,024 | A | * | 6/1961 | Van Allsburg | ........ | E21B 21/015 |
| | | | | | | 175/213 |
| 4,766,701 | A | * | 8/1988 | Roestenberg | ........ | B24D 15/023 |
| | | | | | | 451/344 |
| 5,033,192 | A | * | 7/1991 | Franz | ................. | B23Q 11/0046 |
| | | | | | | 30/390 |

(Continued)

FOREIGN PATENT DOCUMENTS

| DE | 2943001 A1 | 5/1981 | |
| DE | 19650430 C1 | * 11/1997 | ......... B23Q 11/0046 |

(Continued)

OTHER PUBLICATIONS

International Search Report of PCT/EP2020/058082, dated Jun. 26, 2020.

*Primary Examiner* — Robert F Long
(74) *Attorney, Agent, or Firm* — Davidson Kappel LLC (57) ABSTRACT

A dust hood for a power tool, wherein the dust hood includes an extraction region in which a suction hose coming from a dust-sucking device opens into the dust hood. The dust hood has a curvature in the extraction region, wherein the curvature makes it possible for an impulse surge which is generated within a filter cleaning operation of a dust-sucking device to be attenuated by reflection.

14 Claims, 4 Drawing Sheets

(56) References Cited

U.S. PATENT DOCUMENTS

| | | | | |
|---|---|---|---|---|
| 5,074,044 A * | 12/1991 | Duncan | B23Q 11/0046 | 30/390 |
| 5,544,986 A * | 8/1996 | Kudo | B23Q 11/1084 | 409/137 |
| 6,543,549 B1 * | 4/2003 | Riedl | B25F 5/02 | 173/171 |
| 6,896,605 B2 * | 5/2005 | Ohlendorf | B24B 55/052 | 451/454 |
| 7,475,739 B2 * | 1/2009 | Wuensch | B23Q 11/0046 | 173/171 |
| 9,009,982 B1 * | 4/2015 | Sedgwick | B23D 45/003 | 30/388 |
| 9,871,424 B2 * | 1/2018 | Tadokoro | B25F 5/008 | |
| 2002/0034682 A1 * | 3/2002 | Moores, Jr. | H02J 7/0044 | 429/71 |
| 2004/0124721 A1 * | 7/2004 | Pfisterer | H02K 11/33 | 310/58 |
| 2005/0098006 A1 * | 5/2005 | Jorgensen | B23Q 11/0046 | 83/100 |
| 2005/0247463 A1 * | 11/2005 | Wuensch | B23Q 11/0046 | 173/217 |
| 2006/0107633 A1 * | 5/2006 | Walker | B04C 5/187 | 55/385.1 |
| 2007/0007023 A1 * | 1/2007 | Becker | B25F 5/00 | 173/1 |
| 2007/0240313 A1 * | 10/2007 | Layher | B24B 27/08 | 30/123.3 |
| 2008/0302552 A1 * | 12/2008 | Kondo | B25F 5/006 | 173/217 |
| 2009/0245958 A1 * | 10/2009 | Lau | B25F 5/008 | 173/217 |
| 2010/0200260 A1 * | 8/2010 | Mikami | B25C 1/04 | 173/217 |
| 2011/0036610 A1 * | 2/2011 | Vollmer | B25F 5/008 | 173/217 |
| 2012/0121354 A1 * | 5/2012 | Dickey | B23B 31/20125 | 279/142 |
| 2014/0013909 A1 * | 1/2014 | Carlsson | B23D 59/006 | 83/100 |
| 2014/0041142 A1 * | 2/2014 | Theising | B23D 59/006 | 15/246.2 |
| 2014/0154532 A1 * | 6/2014 | Chellew | B25F 5/02 | 429/7 |
| 2014/0262400 A1 * | 9/2014 | Berger | E01C 19/262 | 173/148 |
| 2014/0318821 A1 * | 10/2014 | Wyler | B25F 5/006 | 173/104 |
| 2015/0041164 A1 * | 2/2015 | Sergyeyenko | B25B 23/147 | 173/176 |
| 2017/0071134 A1 * | 3/2017 | Li | B25F 5/02 | |
| 2017/0246732 A1 * | 8/2017 | Dey, IV | B25B 23/1475 | |
| 2018/0125313 A1 * | 5/2018 | King, Jr. | A47L 9/248 | |
| 2018/0236574 A1 | 8/2018 | Kume et al. | | |
| 2018/0236621 A1 * | 8/2018 | Arthur | B23Q 11/0071 | |
| 2018/0369986 A1 * | 12/2018 | Myers | B24B 55/04 | |
| 2020/0245835 A1 * | 8/2020 | Iwakami | A47L 9/22 | |
| 2020/0306849 A1 * | 10/2020 | Hansen | B23D 45/16 | |
| 2021/0229259 A1 * | 7/2021 | Dey, IV | B25D 17/245 | |
| 2022/0193879 A1 * | 6/2022 | Almqvist | B25F 5/006 | |
| 2022/0219252 A1 * | 7/2022 | Holzmeier | B23D 59/006 | |
| 2022/0314422 A1 * | 10/2022 | Karlsson | H01M 50/247 | |
| 2023/0415327 A1 * | 12/2023 | Marsh | B25F 5/02 | |

FOREIGN PATENT DOCUMENTS

| | | | | |
|---|---|---|---|---|
| DE | 202013001142 U1 | | 4/2013 | |
| EP | 1266720 A2 | * | 12/2002 | ........... B23D 59/006 |
| GB | 2423420 A | * | 8/2006 | ............. B25F 5/008 |
| JP | H0733308 U | * | 6/1995 | |

* cited by examiner

DUST HOOD FOR A POWER TOOL

BACKGROUND

The present invention relates to a dust hood for a power tool.

SUMMARY OF THE INVENTION

When working with power tools, such as drilling machines, cut-off or angle grinders or slot cutters, dust is regularly generated which can be injurious to human health, in particular if the dust is breathed in. The prior art discloses dust hoods with which the work means of such power tools, such as drill bits, chisels or cut-off disks, can be clad. Such dust hoods preferably serve to take up the dust arising when working with the power tool. The dust hoods can preferably be connected to a dust-sucking device or a dust remover such that the dust collected in the dust hood can be extracted by the dust-sucking device or the dust remover. This customarily occurs by the generation of a vacuum which is transmitted to the dust hood via a suction hose. The dust hoods preferably have, for the connection of the dust-sucking device or the dust remover, a suction hose connection in the region of which the suction hose opens into the dust hood. For the purposes of the invention, this region of the dust hood is preferably referred to as an extraction region.

In the case of conventional dust hoods which are known from the prior art, dust leakages can occur. Such dust leakages are known for example when the conventional dust hoods are connected to slot cutters. For the purposes of the invention, slot cutters are preferably designed to create a slot in a wall, for example, in order to be able to lay lines in the "knocked-out" slot. A problem with the occurrence of leakage points in the region of which dust can pass out of the conventional dust hoods to the outside, that is to say into the surroundings, is that the corresponding approval standards prescribe ever lower limit values for the dust emission that can be observed only with difficulty, if at all, with non-leaktight dust hoods. In particular, the leakages can disadvantageously result in not enough dust being able to be kept away from the operator of the power tool, with the result that the dust is breathed in by the operator and can get into his or her airways. The dust frequently comprises dust particles which, for example, can be small enough to get into the lungs. Other dust particles can be dangerous to health or cancer-causing.

An escape of dust is observed in conventional dust hoods particularly at the moment of filter cleaning. During the filter cleaning, the filter of the dust remover or of the dust-sucking device is cleared of such dust which has accumulated in the filter during operation. This dust can form a filter cake, for example, in the region of the filter, said filter cake being removed by the filter cleaning process. During the filter cleaning it is possible, for example, for a brief moment for the generation of the vacuum in the dust sucker to be interrupted such that the pressure conditions in the dust sucker change for a brief moment in such a way that a pressure surge is generated which acts on the filter. The filter cake can be loosened or can be released from the filter by means of the pressure surge. In other cases, a counter-air flow can be actively blown through the filter, with the result that the filter cake is released from the filter. These measures can be carried out once or can be repeated in a cleaning cycle. For example, a cleaning cycle of a dust-sucking device can comprise three cleaning surges. The implementation of a cleaning cycle can, for example, be automatically initiated at regular intervals or be controlled according to requirement.

Since, during the cleaning operation, (pressure) surges are frequently exerted on the filter, this operation is for the purposes of the invention preferably also referred to as a knock-off operation. This knock-off operation frequently gives rise to blowback in the suction hose or into the inside of the dust hood that, in the case of conventional dust hoods which are known from the prior art, can lead undesirably to the expulsion of a dust cloud.

It is an object of the present invention to overcome the above-described disadvantages of the prior art and to provide a dust hood for a power tool that, on the one hand, is designed to be particularly leaktight and that, on the other hand, makes it possible to effectively prevent a situation in which dust can get into the airways of an operator of the power tool. Moreover, it is intended with the dust hood to be provided to prevent the expulsion of dust clouds at the time of filter cleaning.

According to the invention, a dust hood for a power tool is provided, wherein the dust hood comprises an extraction region in which a suction hose coming from a dust-sucking device opens into the dust hood. The dust hood is characterized in that the dust hood has a curvature in the extraction region, wherein the curvature is designed to attenuate an impulse surge coming from the dust-sucking device and conveyed through the suction hose into an inner region of the dust hood. In particular, the preferably inwardly formed curvature of the dust hood wall ensures that the at least one cleaning surge is deflected and prevented from penetrating from the extraction space into an interior of the dust hood.

Within the context of the present invention, a defined curvature in the inner wall of a dust hood is provided, with the curvature being arranged in particular in the extraction region of the dust hood. The curvature advantageously ensures through its characteristic configuration that a possible impulse strike or a pressure wave which can arise during filter cleaning of the dust-sucking device to which the proposed dust hood is preferably connected is broken up and/or deflected in the interior of the dust hood. With preference, the dust hood, which can preferably be connected to a power tool, is connected to a dust-sucking device, with the result that the dust occurring when working with the power tool can be extracted by the dust-sucking device. Here, pressure waves and/or impulse surges which occur during a cleaning operation of the filter of the dust-sucking device can be transmitted to the dust hood via the suction hose. The extraction of dust and dust particles preferably occurs by the generation of a vacuum by the dust-sucking device, with this vacuum being transmitted to the dust hood by the suction hose, which connects the dust hood to the dust-sucking device. Consequently, a vacuum is preferably also present within the dust hood.

The deflection of an impulse surge that can be achieved via the curvature of the dust hood preferably generates a counter-impulse with which it is advantageously possible to prevent a situation in which, in the inner region of the dust hood, the vacuum generated by the dust-sucking device breaks down during the filter cleaning. This also allows that dust which arises during the filter cleaning when working with the power tool to be collected in the dust hood and then to be extracted, in particular when the filter cleaning is concluded or the full suction power of the dust-sucking device is available again. In the case of conventional dust hoods without curvature in the inner wall in the extraction region, it has hitherto readily been able to come about that the impulse surges occurring during the filter cleaning penetrate as far as the work means of the power tool and undesirably lead to an outflow of a dust cloud. In other words, what can occur in the case of conventional dust hoods is that a dust cloud is expelled from the dust hood as a result of the impulse surges and pressure waves arising during the filter cleaning, with the result that the dust given off can get into the airways of the operator. The dust cloud is generated in particular by virtue of the fact that the vacuum within the dust hood breaks down, a situation which is advantageously prevented in the case of the dust hood according to the invention by the provision of the defined curvature. The curvature advantageously ensures that the impulse surge is reflected on the wall in which the curvature is present. In particular, the impulse surge striking the curved wall can conceptually be broken down into a number of individual surges which extend substantially in parallel. With preference, these conceptual individual impulse surges are reflected on the curved wall of the dust hood in such a way that they are thrown back into the extraction region and are at least partially extinguished or attenuate one another. As a result, a propagation of the impulse surge into the inner region of the dust hood and a breaking down of the vacuum there is advantageously effectively prevented.

Surprisingly, the provision of the curvature can ensure not only an attenuation or extinguishing of the reflected impulse surges. It has been shown that the reflected impulses are advantageously also capable of attenuating and/or extinguishing newly arriving filter cleaning surges. This can be particularly advantageous when the filter cleaning process of the dust-sucking device to which the power tool is connected comprises a plurality of impulse or compressed-air surges which reach the dust hood in succession. Advantageously, the curvature of the proposed dust hood allows weakening or extinguishing of both already reflected and newly arriving impulse and/or compressed-air surges with which a filter of the dust-sucking device is cleaned or blown through in order to release the filter cake. This attenuation is illustrated in particular by the arrows in FIG. 2b. In particular, the newly arriving impulse surges are swirled by the reflected impulse surges when crossing through the extraction space of the dust hood in such a way that further penetration of the impulse surges into the interior of the dust hood, which is separated from the extraction space by the baffle, is effectively avoided. This advantageously ensures that the vacuum for extracting the dust is not adversely affected in the interior of the dust hood.

It is preferred for the purposes of the invention that the curvature in the inside of the dust hood is defined by a ratio of height to diameter. For the purposes of the invention, the term "diameter of the curvature" preferably describes the distance between two points in which the curvature begins or ends at the otherwise substantially smooth wall. In other words, the two points between which the diameter is present as length can be understood as starting point and end point of the curvature. The diameter of the curvature can lie for example in a range from 15 to 35 mm. For the purposes of the invention, the term "height of the curvature" preferably describes the length by which the curvature stands out on the otherwise substantially smooth wall of the dust hood. In other words, the height can be understood to be the distance between the otherwise substantially smooth wall and the highest point of the curvature. The height of the curvature can lie for example in a range from 5 to 25 mm. A ratio of height to diameter can lie for example in a range from 0.14 to 1.7, with in particular values which are less than 1 being preferred. In other words, it is preferred for the purposes of the invention that the diameter of the curvature is greater than its height, although it is also possible in alternative embodiments for the height of the curvature to be greater than the diameter. When determining the ratio of height to diameter, the value for the height of the curvature is preferably set in relation to the value for the diameter of the curvature. With preference, the values can be divided by one another, with the value for the height forming the numerator of the resultant quotient and the value for the diameter forming the denominator for the ratio described by the quotient. One possible configuration of the curvature is illustrated in the figures. It is particularly preferred for the purposes of the invention that the curvature is formed inwardly, that is to say into the extraction space of the dust hood. In this case, the curvature can be considered in particular as an indentation. However, it may also be preferred that the curvature is formed outwardly.

The dust which arises when working with the power tool can comprise dust particles of different sizes or different diameters and geometries. For example, very small particles barely visible to the human eye can be a constituent part of the dust. However, it can also come about that, when working with the power tool, for example in the course of machining a wall or masonrywork, relatively large worked-out particles occur which are initially too large to be transported through the suction hose, which connects the dust hood to the dust-sucking device, into a collecting container of the dust-sucking device. Such relatively large worked-out particles can therefore initially not be extracted by the dust-sucking device.

In order to be able to further process such coarse worked-out particles and in particular extract them with the dust-sucking device, the dust hood can comprise a baffle, with it advantageously being possible for a coarse filter action to be brought about with the baffle. This can prevent large broken-off, worked-out products, which can occur during the operation of the power tool and can get into the inner region of the dust hood, from clogging the suction region. Rather, the provision of the baffle advantageously ensures that the coarse worked-out particles rebound from the baffle plate and fall back into the work region of the power tool or into the interior of the dust hood, where they are further comminuted by the work means, for example a cutting disk, until the comminuted particles fit through openings of the hose region and can be conveyed through the suction hose into the dust-sucking device.

It is known that the work means of a power tool can break under high mechanical loads. Such undesired rupturing can constitute a risk for the operator of the power tool, for example if he or she is struck by splinters of the ruptured work means. The risk of injury is caused in particular by sharp-edged, pointed or sharp splinters which can lead to cut wounds. It is preferable for the purposes of the invention that individual wall regions of the dust hood are of double-walled design, wherein the preferably double-walled regions of the dust hood wall can advantageously absorb the kinetic energy of the splintered fragments in the event of possible rupturing of a work means of the power tool, with the result that the operator of the power tool is particularly effectively protected from injuries or splinter effects. The work means of the power tool can be formed in particular by a cutting disk or cut-off disk, for example if the work device is a cut-off or angle grinder. It is preferable for the purposes of the invention that in particular those regions of the dust hood wall which can come into contact with the resulting splinters in the event of the rupturing of the cutting disk or cut-off disk are of double-walled design, that is to say of reinforced design, in order to protect the operator of the power tool from injuries.

It can also be preferable for the purposes of the invention that the wall of the dust hood is of continuous double-walled design. A continuously double-walled closure of the dust hood can be advantageous for safety reasons, for example. It can also be preferable that the wall is of at least two-wall design, wherein the wall can completely or partially have more than two layers or be formed from more than two layers or individual walls. In the case of a two-or multi-wall configuration of the walls or wall regions, the regions between the individual walls can be of hollow design or filled with a filler. Examples of filling materials which can be used are lightweight materials in order to keep the weight of the dust hood low. For example, a plastic foam material can be used as filling between the individual walls of the dust hood. The individual walls of the dust hood preferably have a thickness in a range from 0.1 to 3 mm, with a wall thickness in a range from 2 to 3 mm being particularly preferred. In total, the dust hood wall preferably has a wall thickness of at least 5 mm.

The dust hood preferably comprises an electrically conductive base material. It is preferable in other words that the dust hood or its walls is/are formed by an electrically conductive material. It is preferable that in particular the inner side of the proposed dust hood has the electrically conducting base material. The provision of the electrically conductive base material advantageously ensures that static charges which can arise within the dust hood as a result of the frequently dry dust are transferred to the suction hose via the dust hood. In this way, a dissipation of the electrostatic charges via the dust-sucking device is ensured as a particular advantage of the invention. It is very particularly preferred that the dust discharge is preferably configured to be completely coherently electrostatically conducting. In particular, the dust discharge comprises the regions from the origin of the dust to its storage in the dust container. It is preferable in one exemplary embodiment of the invention that the dust hood comprises walls made of an electrically conductive material, wherein the material transfers static charges which can occur as a result of the dry dust to the suction hose via the dust hood, whereby advantageously a dissipation via the dust-sucking device can be ensured. With preference, the entire dust discharge from the origin to the storage of the dust in the dust container is configured to be coherently electrostatically conducting.

For example, electrically conducting or conductive plastic can be used as base material for the dust hood or the walls and constituent parts of the dust hood. It can also be preferable for the purposes of the invention that a conducting additive is admixed with the primary granules for the production of the dust hood or its constituent parts, whereby advantageously an electrostatically conductive material is obtained. For example, metal chips as additive can be admixed with the plastic which is used for the production of the dust hood or its constituent parts.

The electrostatic charges within the dust hood material arise for example as a result of friction between the dust fragments or dust particles and the plastic material of the dust hood, preferentially during operation of the power tool or during dust formation. Such charging takes place in particular when the dust is very dry, that is to say for example in summer or during a long period of dryness. In the event of very high electrostatic charging, an undesired spontaneous discharge can occur via the user if the charges are not dissipated in a targeted and deliberate manner via corresponding grounding. For this purpose, the transitions between the individual constituent parts of the dust hood are also preferably designed to be electrically conductive in order to allow charge dissipation.

With preference, the provision of an electrostatically conducting material for the dust hood or its constituent parts allows charge equalization within the power tool. This is particularly advantageous when charge quantities with different signs accumulate at different regions of the tool and thus form an electrical field. The preferably electrically conductive material of the dust hood can here provide a possibility for charge equalization in that an electron excess can flow off in one region of the tool and can equalize an electron deficiency in another region of the tool. The avoidance of an uncontrolled discharge or charge-equalizing operation also makes it possible in particular to considerably reduce flying sparks and thus a fire risk during operation of the power tool.

It is preferable for the purposes of the invention that the inner region of the dust hood is designed to be homogeneous in terms of flow dynamics, with the result that aerodynamic turbulence in the interior is particularly effectively avoided. The inner region of the dust hood comprises in particular that region in the preferably hollow interior of the dust hood in which the dust occurs as a result of the operation of the power tool. For the purposes of the invention, this region can preferably also be referred to as the work region of the power tool or of the work means. For example, the work tool can be a cut-off or angle grinder which comprises a cutting disk or cut-off disk as work means. It is particularly preferred for the purposes of the invention that the interior of the dust hood comprises a work region of the work means, with it being the case here that, in a preferred configuration of the invention, the work means can be a cutting disk or cut-off disk. Designing the interior of the dust hood to be homogeneous in terms of flow dynamics or aerodynamics makes it possible in particular to ensure a particularly dust-free operation with the power tool. It is very particularly preferable for the purposes of the invention that in particular the inner walls of the dust hood, which preferably delimit the interior of the dust hood, are designed to be homogeneous in terms of flow dynamics or aerodynamics. Designing the interior of the dust hood to be homogeneous in terms of flow dynamics or aerodynamics can be achieved for example by the provision of particularly smooth inner walls. It can also be preferable for the purposes of the invention that the geometry or the spatial configuration of the dust hood interior leads or contributes to the formation of the interior of the dust hood with a homogeneous design in terms of flow dynamics or aerodynamics.

In a preferred embodiment of the invention, the dust hood comprises a baffle as abrasive wear protection or as temperature protection. It is preferable for the purposes of the invention that the baffle is arranged on a front side of the dust deflector. For the purposes of the invention, a dust deflector preferably constitutes a device which serves for improved feeding or deflection of dust particles into the extraction region of the dust hood. If the baffle comprises a metal or a metal alloy or is formed by a metal grating, the baffle can also serve for protecting the plastic parts of the dust hood from sparks or flying sparks. The baffle is preferably designed to be abrasively highly resistant in order to withstand the high mechanical and/or thermal loading by the dust particles and/or by sparks. The provision of the baffle as protection for the plastic constituent parts of the dust hood advantageously makes it possible for the service life of the proposed dust hood to be considerably prolonged. The baffle preferably also absorbs thermal energy, that is to say heat, and thus, by virtue of its good thermal conductivity, ensures cooling within the dust hood. The baffle can be formed in particular by a baffle plate, with the baffle plate preferably being arranged on an inner side of the dust deflector. It can be preferable in one configuration of the invention that the baffle is formed by a grating which, for example, comprises metal or is formed from metal.

The dust hood is preferably formed by two mutually corresponding halves which together form a basic body of the dust hood. The fastening of the baffle preferably occurs by clamping the two dust hood halves. It was completely surprising that the provision of the baffle in the interior of the dust hood in the region of the dust deflector can provide additional abrasive wear protection in combination with further rupture protection. A further advantage of the baffle provided consists in the fact that it can be used to achieve coarse filtering of the dust, wherein the coarse filtering in particular allows large worked-out particles, which initially cannot be extracted with the suction hose of the dust-sucking device, to be thrown back into the interior of the dust hood such that they can be further comminuted with the cutting disk of the power tool. The comminution gives rise to small worked-out particles whose size advantageously allows a situation in which the comminuted worked-out particles can fit through the suction hose and be extracted with the dust-sucking device.

Further advantages can be found in the following description of the figures. The figures, the description and the claims contain numerous features in combination. A person skilled in the art will expediently also consider the features individually and combine them to form useful further combinations.

BRIEF DESCRIPTION OF THE DRAWINGS

In the figures, components which are the same and components of the same type are denoted by the same reference signs. In the figures:

FIGS. 2 a and 2b show sectional illustrations of a preferred embodiment of the extraction region of the dust hood;

DETAILED DESCRIPTION

Figure 1:
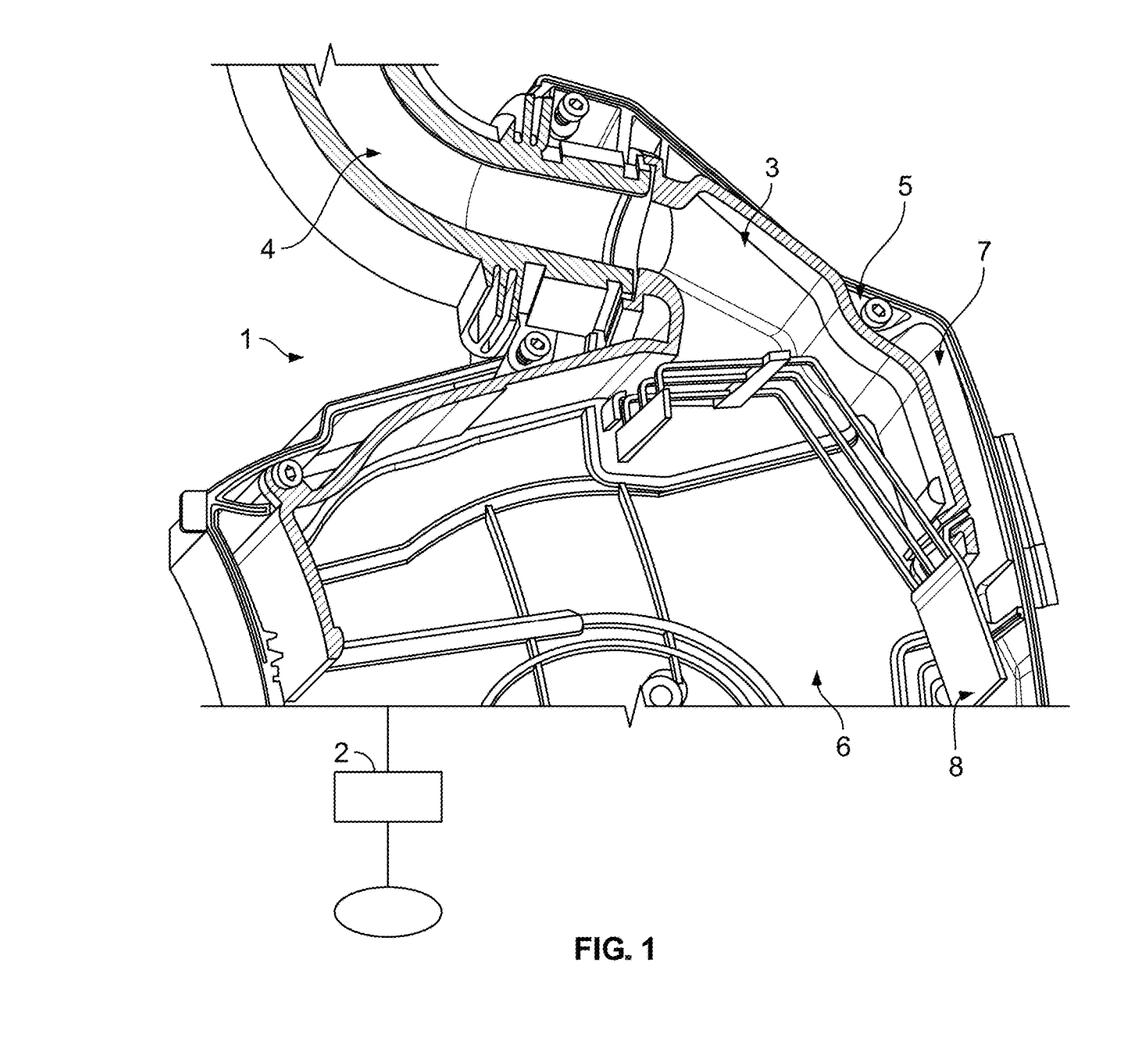
FIG. 1 shows a sectional illustration through a preferred configuration of the dust hood.

FIG. 1 shows a sectional illustration through a preferred configuration of the proposed dust hood (1). In particular, FIG. 1 shows the curvature (5) which is preferably present in a wall of the dust hood (1). It is particularly preferable for the purposes of the invention that the curvature (5) is arranged in the wall which is opposite the outlet of a suction hose (4). The region of the dust hood (1) into which the suction hose (4) opens is preferably also referred to as the extraction region (3) of the dust hood (1). The suction hose (4) preferably connects the dust hood (1) to a dust-sucking device (not shown), wherein, by virtue of the suction hose (4), preferably both the vacuum, which the dust-sucking device generates to suck in the dust, and the impulse surges, which are generated during the filter cleaning, are transmitted from the dust-sucking device to the dust hood (1). The impulse surges which are generated by the dust-sucking device during the filter cleaning and channeled by the suction hose (4) into the dust hood (1) can for example form an impulse pressure jet which, in the case of the proposed dust hood (1), first of all strikes the curvature region (5) of the dust hood wall. The impulse pressure jet is preferably split up as a result of the specific configuration of the curvature (5) and diverted or deflected in different directions. In particular, superimpositions of the reflected impulse surges occur in the curvature region (5) of the dust hood (1), with the result that the reflected impulse surges advantageously weaken or extinguish one another.

This attenuation or extinguishing of the reflected impulse surges achieves the particular advantage of the invention that the impulse surges do not penetrate further into the interior (6) of the dust hood (1). This advantageously leads to the fact that, in the interior (6) of the dust hood (1), the vacuum can also be maintained during the cleaning of the filter of the dust-sucking device. This overcomes the disadvantage of conventional dust hoods which, during the filter cleaning of the dust-sucking device, frequently blow out a cloud of dust particles from individual openings. Maintaining the vacuum in the interior (6) of the proposed dust hood (1) advantageously avoids such a release of a dust cloud, with the result that the loading of the airways of an operator of the power tool (2, shown schematically) can be substantially reduced by means of the invention.

While the vacuum is maintained during the time of the filter cleaning, the dust arising in this time due to the work of the power tool (2) can be advantageously collected in the interior (6) of the dust hood (1). After completion of the filter cleaning, the dust-sucking device can again generate vacuum which can be transmitted by the suction hose (4) to the dust hood (1). In this way, it is possible after completion of the filter cleaning for the dust particles which are collected in the dust hood (1) during the filter cleaning to be extracted by the suction hose (4) and stored in a collecting container of the dust-sucking device.

Moreover, FIG. 1 shows individual regions of the walls (7) of the dust hood (1) which are at least partially of double-walled design. Consequently, the regions of the wall (7) of the dust hood (1) are of more stable design and afford the operator of the power tool (2) improved protection, for example if a work means of the power tool (2) is damaged or breaks. Splinters occurring in the event of such damage can be absorbed by the preferably double-walled regions of the dust hood wall (7), whereby advantageously an escape of the splinters from the dust hood (1) can be avoided. Moreover, it is possible in particular for the outer walls of the at least partially double-walled dust hood walls (7) to have elastic properties which result in the double-walled wall regions (7) being able, for example, to take up deformation forces in the event of dropping the dust hood (1) or the power tool (2). As a result, the double-walled wall regions (7) advantageously also ensure improved fall protection of the proposed dust hood (1) or of the power tool (2).

It is preferable for the purposes of the invention that the device chain of the inner dust region is configured to be electrostatically conducting. As a result, occurring electrostatic charges on the suction hose (4) are advantageously dissipated as far as the dust-sucking device, where they can then be safely dissipated via the ground conductor into the ground. It is advantageously made possible in this way to dissipate charges both in mains-operated and battery-operated power tools (2).

In the preferred embodiment of the invention that is illustrated in FIG. 1 there is also depicted a baffle (8). The baffle (8) in the exemplary embodiment that is illustrated in FIG. 1 is designed as a metal grating. The metal grating (8)

makes it possible for relatively large dust or stone particles, which for the purposes of the invention are preferably also referred to as worked-out particles, to be prevented from entering the extraction region (3) of the dust hood (1). In other words, the baffle (8) marks a boundary between the interior (6) of the dust hood (1), which is present in the lower region of the dust hood (1), and an extraction region (3) of the dust hood (1), which is present in an upper region of the dust hood (1). The baffle (8) preferably ensures that the relatively large dust or stone particles are thrown back into the interior (6) of the dust hood (1), where they can be comminuted again or further when they enter the work region of the work means of the power tool (2). If, after the renewed processing by the work means of the power tool (2), the dust or stone particles have a diameter which fits through the openings of the baffle (8), the worked-out particles can pass into the extraction region (3) of the dust hood (1) and be extracted there by the dust-sucking device. For this purpose, the particles are first of all sucked into the suction hose (4) and then into the collecting container of the dust-sucking device.

Figure 2A:
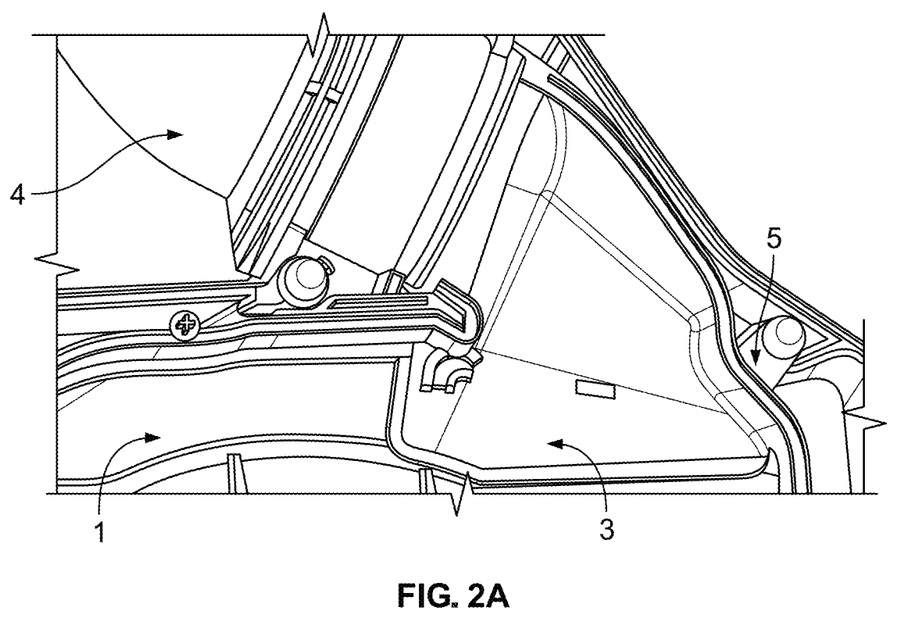
Figure 2B:
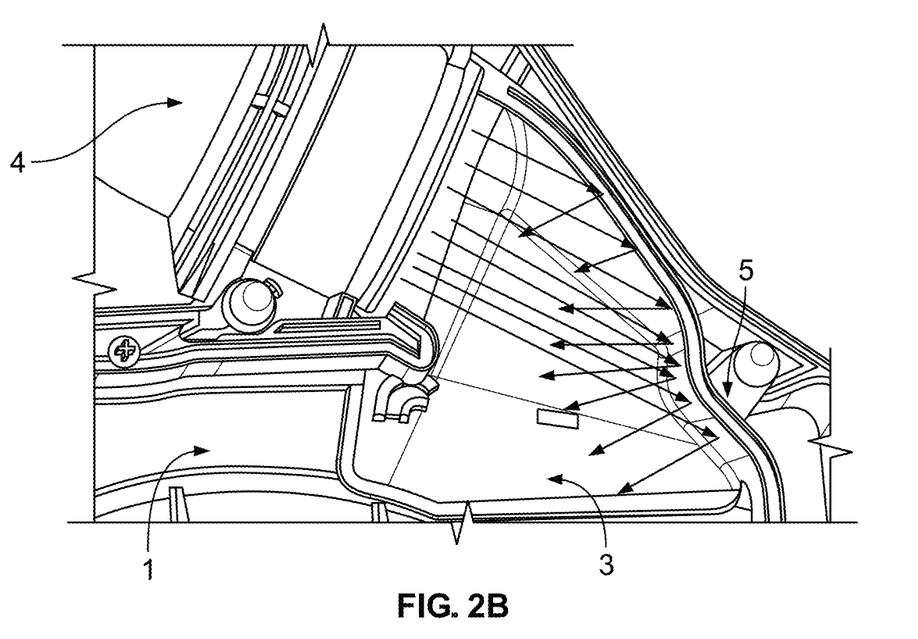

FIG. 2 shows the sectional illustration of a preferred embodiment of the extraction region (3) of the dust hood (1). What is preferably concerned here is the upper region of the dust hood (1) into which the suction hose (4) of the dust-sucking device opens. Preferably arranged opposite this opening of the suction hose (4) into the dust hood (1) is the curvature (5) which advantageously brings about breaking up and/or deflection of the impulse surges of the dust-sucking device. It is preferable for the purposes of the invention that the curvature (5) produces a refraction of the impulse pressure surge such that the impulse pressure surge is attenuated in such a way that it can no longer pass into the interior (6) of the dust hood (1). In the exemplary embodiment of the invention that is illustrated in FIG. 2a, the curvature (5) constitutes a dent, that is to say a concave indentation in that region of the wall of the dust hood (1) which is situated opposite the opening of the suction hose (4). In particular, a dent for the purposes of the invention preferably constitutes an inward bow, that is to say a region in which a curvature into the inside of the dust hood (1) is present. The impulse surges which are output by the dust-sucking device during the filter cleaning will preferably move further rectilinearly upon exiting the suction hose (4) and thus strike the dust hood wall at a certain angle which is defined by the profile of the curved wall region. For the purposes of the invention, the term "curved wall region" preferably stands for that wall region of the dust hood (1) which comprises the curvature (5) of the dust hood wall.

The impulse surges are reflected, according to the impact angle, by the wall of the dust hood (1) and thrown into the extraction region (3) of the dust hood (1). That wall region, opposite the opening of the suction hose (4), of the dust hood (1) which preferably also comprises the curvature (5) is in particular configured such that, by virtue of superimposition effects, the reflected impulse surges are precisely extinguished or at least strongly weakened. Consequently, the impulses can no longer penetrate further into the interior (6) of the dust hood (1). This surprisingly results in the fact that a breakdown of the vacuum in the interior (6) of the dust hood (1) can be effectively avoided, with the result that, during the time of the filter cleaning, in particular no dust clouds are blasted out or blown out from the inside of the proposed dust hood (1) to the outside into the surroundings of the power tool (2). The curvature (5) within the dust hood wall results in particular in the fact that the reflected impulse surges practically fan out and are scattered in different directions, wherein, on account of the small available space in the extraction region (3) of the dust hood (1), the reflected impulse surges are advantageously superimposed in such a way that they are substantially attenuated or completely extinguished. Therefore, the impulse surges at first striking the dust hood wall substantially in parallel are reflected into the entire extraction region (3) of the dust hood (1), where they attenuate one another. This reflection or refraction of the impulse surges is illustrated in particular in FIG. 2b. Here, the black arrows preferably represent an impulse surge which is broken down conceptually into individual impulse surges. These individual impulse surges which are generated by the dust-sucking device during the filter cleaning are refracted or reflected on the curved dust hood wall and deflected into the extraction region (3) of the dust hood (1). The reflected or refracted conceptual individual impulses are represented in FIG. 2b, preferably by white arrows.

Figure 3:
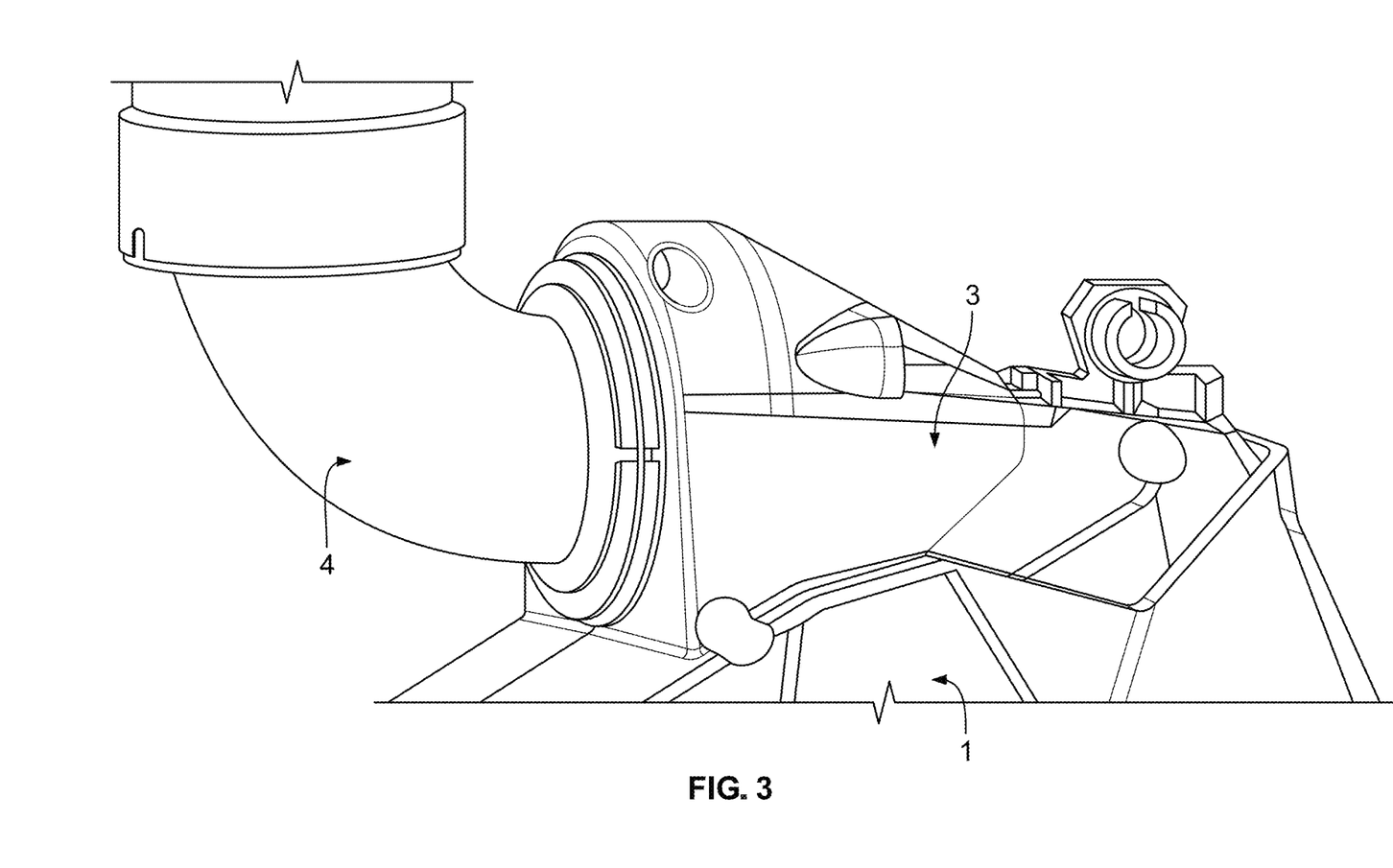
FIG. 3 shows a view of a preferred embodiment of a dust hood assembly.

FIG. 3 shows a view of a preferred embodiment of a dust hood assembly. Illustrated in FIG. 3 is in particular a preferred configuration of a proposed dust hood (1). FIG. 3 shows in particular the upper region of the dust hood (1), which is formed by an extraction region (3). Into this extraction region (3) there opens a suction hose (4) which connects the dust hood (1) to a dust-sucking device. Present in a lower region of the dust hood (1) is the interior (6) of the dust hood (1), which is separated from the extraction region (3) by a baffle (8; see FIG. 4).

Figure 4:
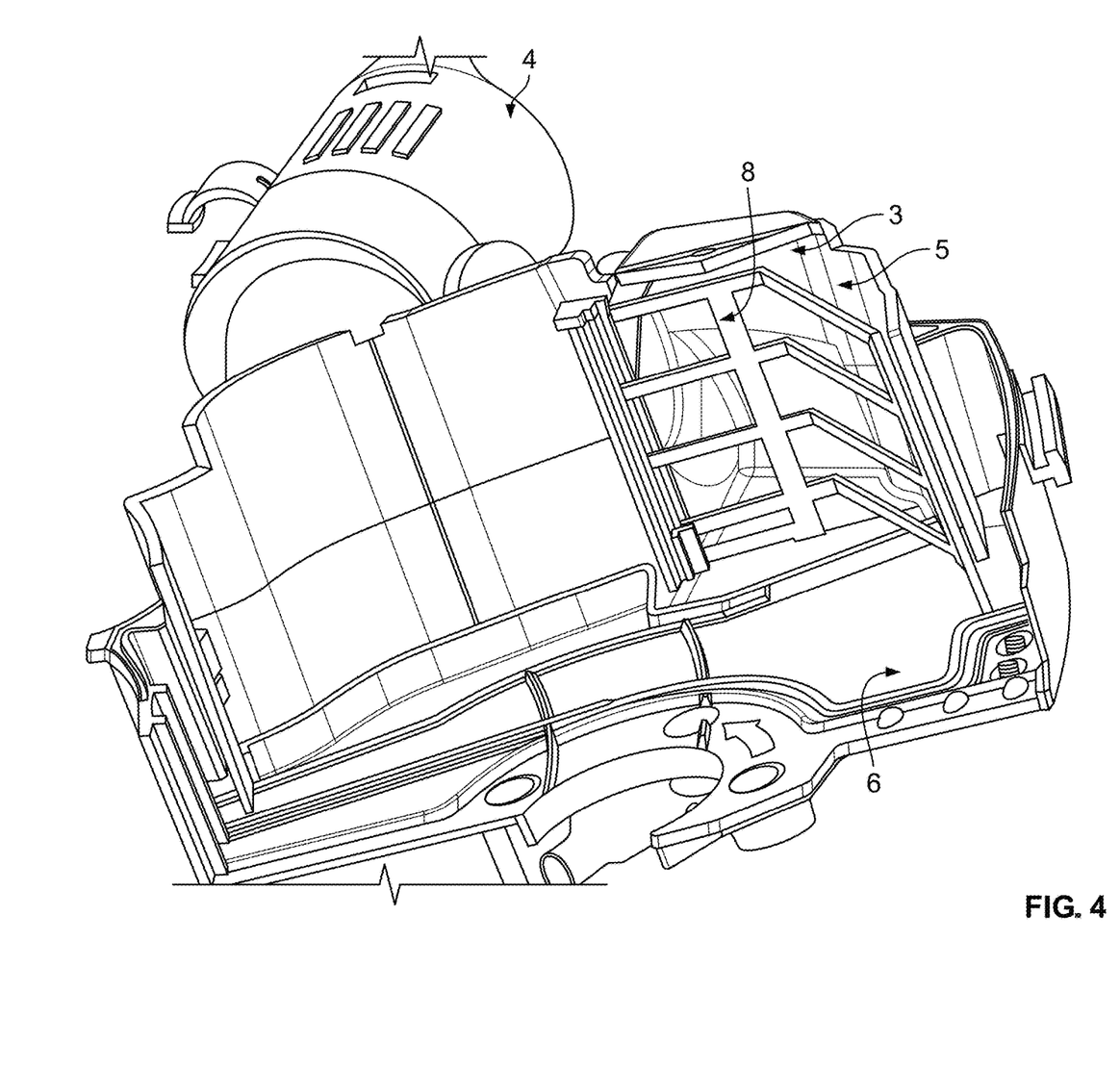
FIG. 4 shows a view of a preferred configuration of the baffle.

FIG. 4 shows a view of a preferred configuration of the baffle (8) of the proposed dust hood (1). Above the baffle (8), which is designed as a metal grating in the depicted exemplary embodiment of the invention, there is situated the extraction region (3) of the dust hood (1) with curvature (5). The curvature (5) or the curved wall region of the dust hood (1) is preferably arranged opposite the opening of the suction hose (4) by which the dust hood (1) can be connected to a dust-sucking device. Underneath the metal grating (8) there is situated the inner region (6) of the dust hood (1), in which, for example, the work means of the power tool (2) can be present.

It is preferable for the purposes of the invention that the dust hood (1) comprises two shells or halves which form a basic body of the dust hood (1). The two shells hold the metal grating (8) and clamp it in. Consequently, large flaked worked-out fragments or worked-out particles are retained and do not clog the suction hose (4). This makes possible secure working with the power tool (2) or the dust-sucking device without interruptions due to clogged hose lines. Moreover, the provision of a baffle (8) reduces the occurrence of a dust cloud which can arise as a disadvantageous consequence upon clogging of the extraction line.

LIST OF REFERENCE SIGNS

1 Dust hood
2 Power tool
3 Extraction region
4 Suction hose
5 Curvature
6 Inner region of the dust hood
7 Double-walled wall of the dust hood
8 Baffle

What is claimed is:
1. A dust hood for a power tool, the dust hood comprising:
an extraction region where a suction hose coming from a dust-sucking device opens into the dust hood; and a curvature in the extraction region designed to attenuate an impulse surge coming from the dust-sucking device and conveyed through the suction hose into an inner region of the dust hood;

wherein the curvature is designed so the attenuation produces a counter-impulse to an impulse surge, the counter-impulse preventing a situation in which, in an inner region of the dust hood, a vacuum generated by the dust-sucking device and conveyed by the suction hose breaks down at the time of a filter cleaning;

wherein the curvature is a dent directly opposite an opening of the suction hose: wherein the dust hood has an inner and outer wall, the inner wall having the dent and the outer wall being straight opposite the dent.

2. The dust hood as recited in claim 1 wherein the curvature is defined by a ratio of height to diameter.

3. The dust hood as recited in claim 1 wherein individual wall regions of the dust hood are of double-walled design.

4. The dust hood as recited in claim 1 wherein the dust hood includes an electrically conductive base material.

5. The dust hood as recited in claim 1 wherein an inner region of the dust hood is designed to be homogeneous in terms of flow dynamics without aerodynamic turbulence.

6. The dust hood as recited in claim 1 further comprising a baffle as abrasive wear protection and temperature protection.

7. The dust hood as recited in claim 6 wherein the baffle separates the extraction region from the inner region of the dust hood.

8. The dust hood as recited in claim 1 wherein the outer wall is elastic.

9. The dust hood as recited in claim 8 wherein the outer wall includes plastic.

10. The dust hood as recited in claim 1 wherein the outer wall and the inner wall each have a thickness of from 0.1 mm to 3 mm.

11. The dust hood as recited in claim 10 wherein the thickness is of from 2 mm to 3 mm.

12. The dust hood as recited in claim 10 wherein the outer wall and inner wall define a doubled-wall design having a thickness of at least 5 mm.

13. The dust hood as recited in claim 9 further comprising a baffle, the baffle being made of metal as serving to protect the plastic from flying sparks.

14. The dust hood as recited in claim 13 wherein the inner and outer walls are part of a shell half, the metal grating being wider than the shell half.

* * * * *